June 12, 1945.  T. B. FARRINGTON ET AL  2,377,871
LAMP HANGER STEM AND GUIDE
Filed Jan. 28, 1944  2 Sheets-Sheet 1

INVENTORS
THAYER B. FARRINGTON
ROBERT K. FARRINGTON
WADE T. KELLER
BY Hyde and Meyer
ATTORNEYS.

June 12, 1945.　　　T. B. FARRINGTON ET AL　　　2,377,871
LAMP HANGER STEM AND GUIDE
Filed Jan. 28, 1944　　　2 Sheets-Sheet 2

INVENTORS
THAYER B. FARRINGTON
ROBERT K. FARRINGTON
WADE T. KELLER.
By Hyde and Meyer.
ATTORNEYS Patented June 12, 1945

2,377,871

UNITED STATES PATENT OFFICE 2,377,871

LAMP HANGER STEM AND GUIDE

Thayer B. Farrington and Robert K. Farrington, Cleveland Heights, and Wade T. Keller, Cleveland, Ohio, assignors to The Thompson Electric Company, Cleveland, Ohio, a corporation of Ohio Application January 28, 1944, Serial No. 520,004

3 Claims. (Cl. 248—320)

This invention relates to improvements in a lamp hanger stem and coacting guide used in connection with lowering lamp hangers.

Among the objects of the present invention are improvements in the positive positioning of the stem in the guide while at the same time reducing the contacting areas between the two parts so as to provide ease in positioning the parts, together with freedom from corrosive attachment of one of the parts to the other during long periods of disuse.

Another object of the invention is to provide an easy entrance of one part within the other as the parts are moved to coacting latching position, together with refinements in the contacting surfaces on the stem and guide to better enable them to serve their purpose.

Another object of the invention is to provide a coacting lamp hanger stem and guide wherein the stem is arranged for efficient coaction with guides of modified forms.

Still another object of the invention is to provide lamp hanger stems adapted to be utilized with flexible cables of different sizes.

Other objects and advantages of our invention will be apparent from the accompanying drawings and specification and the essential features will be summarized in the claims.

In the drawings

Fig. 7 is a sectional view of the guide taken along the line 7—7 of Fig. 1; while

The stem and guide which form the subject matter of the present application are parts of a larger structure, a representative form of which is shown in United States Patent 2,303,626, granted December 1, 1942, to Thayer B. Farrington. This shows a known type of lowering lamp hanger wherein a guide such as that shown herein at 10 is part of a fixed structure mounted in an elevated spot, such as on a pole or stack outdoors or on a roof truss indoors. A stem as indicated herein at 11 carries a lamp which is lowerable by means of a flexible cable, chain or the like, as shown in the above mentioned Farrington patent, whereby the lamp may be disconnected from the fixed portion of the hanger and lowered to a floor or platform for cleaning, servicing and the like. The parts shown herein at 10 and 11 are intended to perform functions like similar parts described in the above-mentioned Farrington patent. The present invention relates to improvements in the stem and guide alone.

Figure 1:
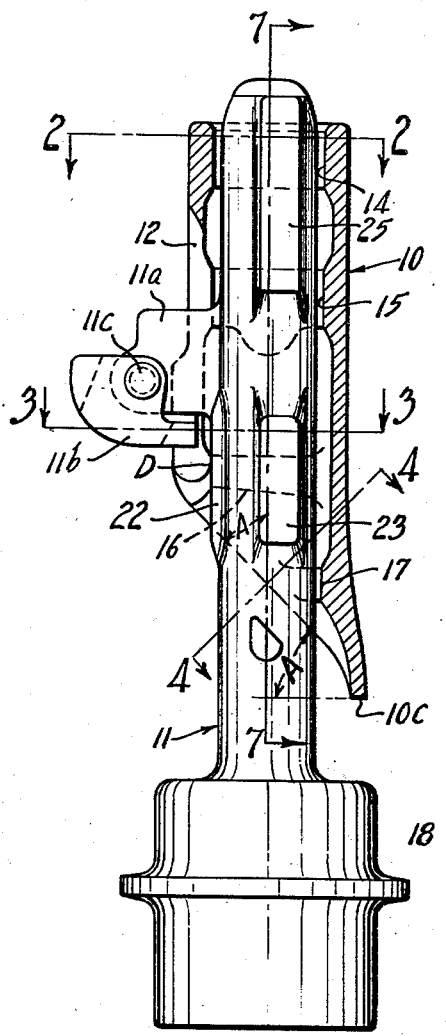
Fig. 1 is a view of our coacting stem and guide in fully engaged or latched position, the stem being shown in side elevation and the guide being shown in central longitudinal section.

One of the disadvantages of earlier structures was that if sufficient clearance were allowed between the stem and guide to permit the stem to enter easily into the guide to attain latching position as shown herein in Fig. 1, then there was objectionable side play between the parts so that if the lamp were exposed in an outdoor position to the force of the wind, it would sway, causing objectionable results and a wearing out of the parts. Another disadvantage of the older structures was that when maintained in latched positioned for a long period without servicing, corrosion would occur between the stem and guide so that it was difficult if not impossible to release the stem from the guide when it was finally desired to lower the lamp for servicing. Our present invention overcomes all of these disadvantages.

Figure 4:
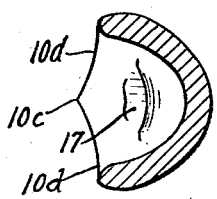

Briefly, the guide 10 is generally cylindrical in form and provided with a flange 10a nearer the upper than the lower end thereof, this flange having openings 10b on opposite sides of the axis of the guide for attachment to the fixed hanger structure as by bolts or the like. In another form of our device mentioned later, the guide may terminate on a level with the upper surface of the flange 10a. The lower end of the guide is cut off along a plane at an angle of approximately 45° to the axis of the guide as indicated by the angle A in Fig. 1. Obviously the angle which the plane of the cut end makes with the horizontal is also equal to the angle A. The lowermost part of this cut surface is sharpened to a point as indicated at 10c in the various views for the purpose of guiding the stem, as will later appear. The cut surfaces of the cylinder at the lower end are given smoothly contoured surfaces, as indicated at 10d in Fig. 4, for the purpose of smoothly guiding the stem into position. Along one side wall of the guide a slot 12 is cut through the wall parallel to the axis of the guide and this serves to receive the fin-like projection 11a of the stem 11 as it moves to the position of Fig. 1. Along the sides of the slot and extending outwardly from the guide are parallel ribs 13 which are notched at 13a to receive the latch dog 11b which, as shown in Fig. 1, is pivotally mounted at 11c on the projection 11a of the stem. This latch dog is arranged so that gravity tends to move it into latching position, and it is released by a slight upward movement of the stem relative to the guide, followed by a quick lowering of the stem 11, as described in the above mentioned Farrington patent.

The guide 10 is provided with inwardly extending projections at various levels for contacting coacting projections of the stem 11. At the uppermost level the ring 14 projects inwardly. At an intermediate level is the inwardly projecting ring 15. At a lower level are inwardly extending arcuate projections 16 each slightly less than a semicircle in extent. At the lowermost level is an arcuate projection 17 on the back wall only of the guide and of limited extent. The purpose of these inward projections will be more fully explained in connection with the positioning of the stem.

Figure 5:
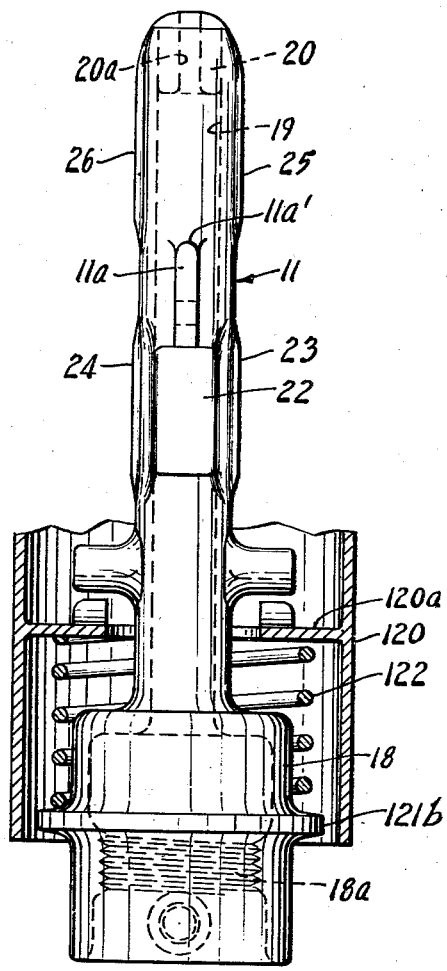
Fig. 5 is a side elevational view of the stem of Fig. 1, but taken at 90° therefrom.
Figure 6:
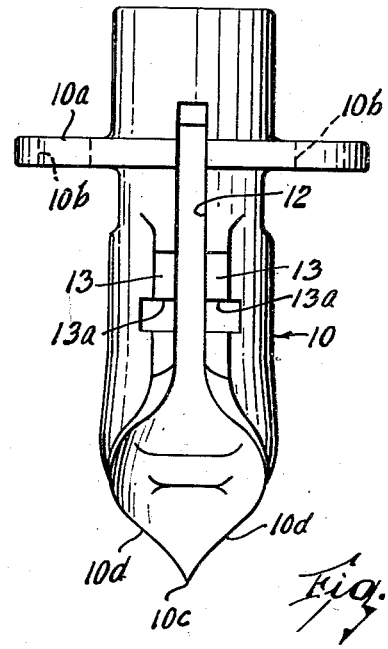
Fig. 6 is a side elevational view of the guide as viewed from the left-hand side of Fig. 1.
Figure 7:
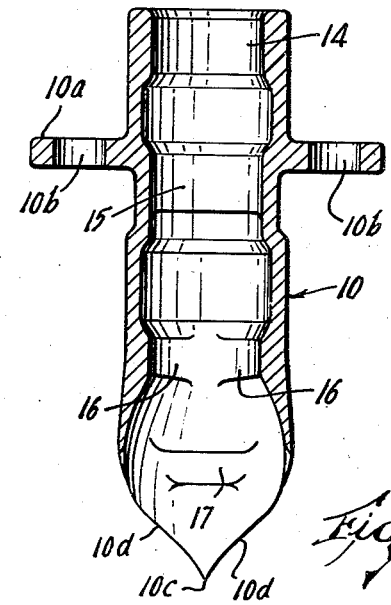
Figure 8:
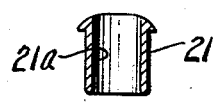
Fig. 8 is a sectional view through a modified form of cable guide.

The stem 11, as best seen in Figs. 1 and 5, has an upper portion generally cylindrical in shape terminating in a downwardly opening cup 18 to which the lowering lamp is attached by means of the threads 18a. A flexible cable, chain or the like, extends downwardly through the central hollow 19 of the stem and a securing member engages the shoulders of the cup 18 to retain the flexible member in position in the stem. This flexible lowering member passes out the upper end of the stem and over suitable pulleys, as shown in the above mentioned Farrington patent. Various size adapters are provided as indicated at 20, Fig. 5, and 21, Fig. 8. These have an outer diameter which is uniform and adapted to fit snugly within the internal diameter of the hollow 19 of the stem. The inside diameter 20a of the adapter 20 is smaller than the inside diameter 21a of the adapter 21 so that the adapter 21 may be used with a cable of large diameter and the adapter 20 may be substituted as a cable of smaller diameter is used. Such an adapter avoids objectionable side play of the cable inside the stem.

Outwardly extending projections are provided at different levels on the stem 11 and adapted to coact with the projections 14, 15 and 16 already described in connection with the guide 10. Referring to Figs. 1 and 5, at the lower level three projections 22, 23 and 24 are provided at equally spaced points about the periphery of the stem 11. The projection or pad 22 is adjacent the latch dog 11b while the projections 23 and 24 are positioned at approximately 90° (or a little more) in opposite directions around the stem from the pad 22. At an upper level the stem 11 is provided with two outwardly extending projections 25 and 26 which are vertically alined respectively above the projections 23 and 24. It will be noted that these upper projections 25 and 26 are of sufficient vertical extent to engage either the projection 15 or 14 of the guide 10.

Figure 3:
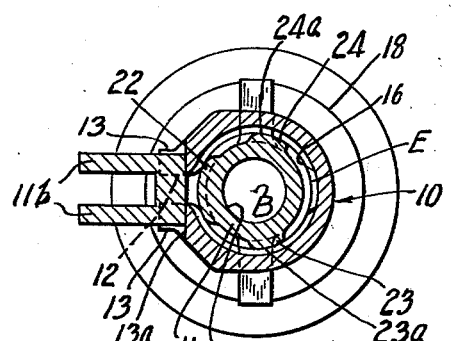

Necessarily a slight play must be allowed between the outer diameter of the projections 22, 23 and 24 on the one hand and the inside diameter of the projections 16 on the other. Preferably therefore the outer arcuate faces 23a and 24a of the projections 23 and 24 are arranged upon an arc about a center B which is eccentric with respect to the axis of the stem by an amount approximately equal to the above described play. This provides a snug fit between the parts as illustrated in Fig. 3. In a similar manner the outer arcuate faces 25a and 26a of the projections 25 and 26 are formed about a center C which is eccentric from the axis of the stem by the same amount as the eccentricity of the center B previously described, and the eccentricity is in the same direction from the axis.

Figure 2:
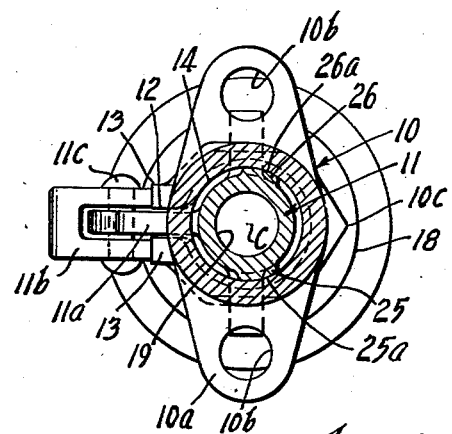
Figs. 2, 3 and 4 are sectional views taken along similarly numbered lines of Fig. 1, the stem being omitted in Fig. 4 for clearness.

It results from the above described construction that when the stem 11 is pulled upwardly into the guide 10 by means of a flexible cable or the like, as described, the upper surface of the fin 11a which is rounded as indicated at 11a', Fig. 5, engages on one side or the other of the point 10c and gradually travels up the 45° angle A of the lower end of the guide, being caused to smoothly travel along this surface by means of the curved surfaces 10d until the fin 11a enters the slot 12. Further upward movement of the stem eventually causes engagement of the latch dog 11b in the notches 13a. Referring to Fig. 5, upward pull on the cable raises stem 11 causing the flange 121b, at the lower end of the stem, to compress spring 122 against flange 120a of the sleeve 120 of a lowering lamp hanger member not otherwise shown in the drawings. The parts 120, 120a, 121b and 122 are analogous to parts 20, 20a, 21b and 22 as shown in Fig. 2 of the above-mentioned Farrington patent where the compression of the spring 22 (here 122) causes the firm engagement of contacts 15 and 25 of the said Farrington patent. Upon release of the cable the weight of the lamp plus the effect of spring 122 acts downwardly on the stem 11 and is resisted by the latch dog 11b. This would normally cause a cocking of stem 11 in a clockwise direction as viewed in Fig. 1 about the latch dog 11b as a fulcrum. This cocking is prevented because the projection 22 tightly engages the projection 16 at the point D (Fig. 1) while the projections 25 and 26 engage the projection 14 at points angularly spaced around the axis of the coacting parts from the point D. Thus there is a three-point centering effect of the projections 22, 25 and 26 at levels spaced apart vertically on the coacting stem and guide. This firmly holds the parts with the axis of stem 11 vertical and with a minimum of surface contact between the stem and guide, thus resulting in a minimum holding effect of any corrosion between the stem and guide. Any corrosion at the upper levels is free to fall down between the spaced projections 25 and 26 at the upper level and 22, 23 and 24 at the lower level. There is additional clearance at the point E (Fig. 3) between the ends of the projections 16. It will be noted in Figs. 2 and 3 that portions of the projections 25 and 26 at the upper level and of 23 and 24 at the lower level lie diametrically opposite each other so as to provide full engagement across the coacting diameters of the stem and guide at these points. This prevents side sway. The projection 17 aids in centering the stem as it enters the guide and also aids in eliminating sway of the stem toward and away from the latch dog when the parts are in latched position.

As mentioned before the projections 25 and 26 are long enough to engage both projections 14 and 15 of the guide. Therefore when a guide is used which is cut off at the upper surface of the flange 10a the same stem 11 may be utilized and the projections 25 and 26 then coact with the projection 15 in the same manner as previously described in connection with the projection 14. In this case the stem is centered in the guide in exactly the same way and the coacting projections 15, 25 and 26 prevent lateral movement of the stem in the guide as previously described.

What we claim is:

1. Means for centering a vertically extending lamp hanger stem in its hollow guide comprising bosses spaced circumferentially about said stem at upper and lower levels and engaging the interior walls of said guide for holding said stem centered therein, while providing a limited surface of contact between said stem and guide, whereby corrosion and dirt may fall away between said spaced bosses.

2. Means for centering a vertically extending stem in its hollow guide, wherein a holding latch interengages said stem and guide intermediate their ends, comprising bosses spaced circumferentially about said stem at upper and lower levels and engaging the interior walls of said guide for holding said stem centered therein, one of said bosses engaging said guide adjacent said latch, and two of said bosses engaging said guide at a higher level than said one boss and on the side of said stem away from said latch, whereby a three-point centering support is provided.

3. Means for centering a vertically extending stem in its hollow guide, wherein a holding latch interengages said stem and guide intermediate their ends, comprising vertically extending bosses spaced circumferentially about said stem, there being at least one of said bosses at approximately the level of said latch and two of said bosses at a higher level and spaced around said stem approximately one hundred and twenty degrees from said first named boss, a horizontally extending boss on the interior wall of said guide engaging said first named stem boss, and a horizontally extending boss on the interior wall of said guide engaging said two stem bosses at the higher level.

THAYER B. FARRINGTON.
ROBERT K. FARRINGTON.
WADE T. KELLER.